United States Patent
Inganäs et al.

(10) Patent No.: US 6,482,299 B1
(45) Date of Patent: Nov. 19, 2002

(54) POLYMER GEL ELECTRODE

(75) Inventors: Olle Inganäs, Linköping (SE); Soumyadeb Ghosh, Haryana (IN)

(73) Assignee: Forskarpatent I Linkoping AB (SE)

( * ) Notice: Subject to any disclaimer, the term of this patent is extended or adjusted under 35 U.S.C. 154(b) by 0 days.

(21) Appl. No.: 09/743,366

(22) PCT Filed: Jul. 5, 1999

(86) PCT No.: PCT/SE99/01217

§ 371 (c)(1), (2), (4) Date: Jan. 9, 2001

(87) PCT Pub. No.: WO00/02949

PCT Pub. Date: Jan. 20, 2000

(30) Foreign Application Priority Data

Jul. 9, 1998 (SE) .................................................. 9802489

(51) Int. Cl.[7] .............................. C25B 9/00; C25B 3/00; H01M 6/00; H01M 8/00
(52) U.S. Cl. ........................ 204/242; 361/523; 429/122; 429/12; 429/30; 205/414; 205/419
(58) Field of Search ................................ 205/161, 413, 205/419, 422; 252/500; 528/373, 378, 391, 422, 491, 492; 429/122, 12, 30; 361/523

(56) References Cited

U.S. PATENT DOCUMENTS 5,489,400 A * 2/1996 Liu et al. ..................... 252/500

FOREIGN PATENT DOCUMENTS

| DE | 4414255 A1 | 10/1995 | ........... C08G/61/12 |
|---|---|---|---|
| DE | 4424711 A1 | 1/1996 | ........... C08F/38/00 |
| FR | 2632979 A1 | 12/1989 | ............. C25B/3/10 |
| JP | A 10120769 | 5/1998 | ........... C08G/61/12 |
| JP | A 10140141 | 5/1998 | ........... C08G/61/12 |
| WO | WO 95/28742 | 10/1995 | ........... H01L/29/28 |

OTHER PUBLICATIONS

Wallace et al., "Novel Conducting Polymer–Polyelectrolyte Composites", Synth. Met. (month unavailable, 1997), vol. 84, Nos. 1–3, pp. 323–326.*

"Supramolecular Self–Assembly for Enhanced Conductivity in Conjugated Polymer Blends: Ionic Crosslinking in Blends of Poly (3,4–ethylenedioxythiophene)–Poly (styrenesulfonate) and Poly (vinylpyrrolidone)", Ghosh, Rasmusson and Inganas, Adv. Mater. 1998, vol. 10, No. 14, pp. 1097–1099, No Month Available.

"Fabrication of an Electrically Conducting Full–Interpenetrating Polymer Network", Wang and Rubner, Mater. Res. Soc. Symp. Proc., vol. 247, 1992, pp. 759–764, No Month Available.

* cited by examiner

Primary Examiner—Edna Wong
(74) Attorney, Agent, or Firm—Hayes Soloway P.C.

(57) ABSTRACT

Polymer microgel particles dispersed in an aqueous medium. PEDOT-PSS complex, with excess fixed negative charge and dispersed in aqueous media are crosslinked. Because of the network structure and due to the gel nature of the particles used as its building block, provides the prepared gel material with excellent access of the electrolyte solution to the polymer chains. The electrical connectivity of the polymer chains is further improved by eletropolymerization of another conducting polymer, such as polypyrrole (PPy), polyaniline (PAni), using the polymer gel as the template.

17 Claims, No Drawings

POLYMER GEL ELECTRODE

The object of the present invention is the preparation and use of highly porous conjugated polymer electrodes in electrochemical systems, as an electrode in a secondary battery, electrodes in a supercapacitor or electrocatalytic converter, or in sensor materials. The preparation route leads to more than 90% porous materials which show both high electronic and ionic conductivity, and are therefore useful for large effective contact area in supercapacitors; it also gives the function of faradaic charge transfer for charge storage in secondary batteries. The porous structure is also useful to enable charge transfer to soluble or immobilized redox species and is therefore useful as a contact in redox batteries, electrocatalytic systems and sensors.

BACKGROUND OF THE INVENTION

Prior Art

Since electrochemistry essentially involves processes at the electrode-electrolyte interface, there has been a constant motivation for increasing the effective surface area of the electrodes. This is achieved by increasing the roughness or porosity of the electrodes. High surface area carbon electrodes have been fabricated from carbon pastes, fibrous carbon and carbon foams (S Sarangapani, B. V. Tilak, C.-P. Chen, *J. Electrochem. Soc.* 143 (1996) 379, J. D. Brown, R. F. Simandi U.S. Pat. No. 5,268,395 (1993)). Such materials have performed well as double layer capacitors and as support for the redox centers in electrodes for electrochemical capacitors, sensors and electrocatalysts (G. A. Hards, T. R. Ralph, U.S. Pat. No. 5,501,915 (1996); J. L. Kaschmitter, S. T. Mayer, R. L. Morrison, R. W. Pekala, WO 9423462 (1994)). The extreme case of this approach of increasing the surface area would be preparation of an electrode in which each molecule is in direct contact with the electrolyte, keeping electrical contact with the external circuit. Electrically conducting materials in gel state would have such a property. Fabrication of such materials has become a possibility with the advent of novel materials such as conducting polymers and carbon nano-tubes (C. M. Niu, E. K. Sichel, R. Hoch, D. Moy, H. Tennent, *Appld. Phys. Lett.*, 70 (1997) 1480). In last two decades extensive studies have been done on electrochemical properties of conducting polymers (M. E. G. Lyons (ed.), *Electractive Polymer Electrochemistry*, pt 1, Plenum Press, New York (1994)). This kind of polymers often have good permeability to small molecules, leading to direct interaction of the bulk material with the electrolyte solutions (Y. M. Volfkovich, V. S. Bagotzky, E. Y. Pisarevskya, *Electrochim. Acta*, 41 (1996) 1905). They act as electroactive, at the same time, electron conducting material, when coated on an electrode. However, the mobility of ions in such materials is generally low, resulting in decrease in the reversibility of the electrode at high current densities (M. E. G. Lyons (ed.), *Electroactive Polymer Electrochemistry*, pt 1, Plenum Press, New York (1994)). Soluble conducting polymers have been stabilized in gel state (X. Chen, O. inganats, *Synth. Met.*, 74 (1995) 159; S. Shakuda, T. Kawai, S. Morita, K. Yoshino, Japn. *J. Appld. Phys.* pt 1, 33 (1994) 4121). However, detail investigation on the effect of the gel nature of the material, on their electrochemical properties, is yet to be reported. Moreover, these polymers are not water soluble, hence, their gels can only be prepared in non-aqueous medium. Due to low conductivity of non-aqueous systems, such material are not suitable for preparation of high power electrodes. Conducting polymers have been grown using conventional hydrogeis to impart a gel like characteristics (K. Gilmore, A. J. Hodgson, B. Luan, C. J. Small, G. G. Wallace, *Polym. Gels & Network*, 2 (1994) 135; S. Ghosh, V. Kalpagam *Synth. Met.* 60 (1993) 133). However, in such systems the conducting polymer tend to agglomerate rather than forming a network structure, leading to poor electrical connectivity through out the material (X. M. Ren, P. G. Pickup, *J. Electroanal. Chem.*, 396 (1995) 359). Composite of conducting polymers with graphite fibers have been prepared, which shows moderately good charge storage capacity as capacitor electrodes (B. Coffey, P. V. Madse, T. O. Poehier and P. C. Searson, *J. Electrochem. Soc.* 142 (1995) 321).

Apart from increasing the effective surface area, conducting gels, can impart various chemical characteristics to the electrodes more effectively than that can be done by surface modifications of solid electrodes. Such materials, with functionalized "molecular wires" stabilized as gel in the electrolyte solution, may lead to development of highly sensitive and fast sensors (M. E. G. Lyons, C. H. Lyons, C. Fitzgerald T. Bannon, *Analyst* 118 (1993) 361), electrocatalysts (G. A. Hards, T. R. Ralph, U.S. Pat. No. 5,501,915 (1996)), selective electromembranes etc. Further, conducting polymers have multiple oxidation states which leads to higher pseudocapacitance (B. E. Conway, *J. Electrochem. Soc.*, 138 (1991) 1539) and hence, higher energy densities for capacitor electrodes.

One of the most direct application of porous electrodes have been in capacitor devices. Electrodes containing redox species may have very high capacitance values—even up to several hundreds of Farads per gram of the electrode material. Such capacitors are known as supercapacitors, which are used as the energy storing element in electronic equipment as memory backup for computers, camcorders, cellular phones etc. Supercapacitors may find application in the field of power electronics e.g. in UPS (uninterrupted power supply) and motor starters. The major driving force for the development of supercapacitors in USA have been their potential for application in electric vehicles (A. F. Burke, 36th *Power Sources Conference*, (June 1994) Cherry Hill, N.J.).

Porous activated carbon electrodes with or without embedded redox compound have been applied as the electrode material in supercapacitors having capacitance of several hundreds of Farad per gram of material (H. Shi, *Electrochim. Acta*, 41 (1996) 1633). Mixed valent metal oxides as electrode material provide maximum capacitance (B. E. Conway, *J. Electrochem. Soc.*, 138 (1991) 1539; F. P. Malaspina, JP 6503924 (1994), U.S. Pat. No. 5,079,674 (1992)), but have the disadvantage of being costly. Though so far only the carbon and the metal oxide based electrodes have found commercial application, there is increasing interest in conducting polymers as new materials for supercapacitor electrodes (J. A. C. Carlberg, O. W. Inganas, SE 9602955 (1998); C. Li, K. K. Lian, H. Wu, U.S. Pat. No. 5,591,318 (1997); A. J. Rudge, J. P. Ferraris, S. Gottesfeld, U.S. Pat. Nos. 5,527,640 (1996) and 5,527,640 (1996)). This is based on the fact that in conducting polymers, the charge is stored in the whole bulk of the material (A. Rudge, J. Davey, I. Raistrick, S. Gottesfeld, *J. Power Sources*, 47 (1994) 89), rather than only on the surface as in carbon based electrodes. These polymers are also of low cost and easy to produce. Another merit of conducting polymers, which is yet to be fully capitalized on and the present work is a step in that direction, is the possibility that these polymers can be nano-structured into suitable morphology (C. R. Martin, *Science*, 266 (1994) 1961) for optimum energy and power density. As described above, conducting gels may lead to electrodes with maximum surface area. However, it should be noted that though the surface area of an electrode increases with a decrease in pore diameter in an electrode material, the total extractable charge at short time shows a more complex behavior (S. Sarangapani, B. V. Tilak, C. P. Chen, *J. Electrochem. Soc.* 143 (1996) 3791). It shows rise with the decrease in the diameter until an optimal value (in the range of a few nanometers) is reached and then shows a decreasing trend. Therefore, an electrode with pore diameter of intermediate size or containing a distribution of diameter sizes, are more desirable for fast capacitor electrodes.

The present work is centered on the idea of nanostructuring a conducting gel with optimum network morphology. This has been achieved by crosslinking conducting polymer microgel particles dispersed in an aqueous medium. PEDOT-PSS complex, with excess fixed negative charge and dispersed in aqueous media, was found to be the suitable compound for this preparation. The dispersion is commercially available by the trade name, Batron-P, from Bayer AG, Germany. Because of the network structure and due to the gel nature of the particles used as its building block, the gel material prepared provides excellent access of the electrolyte solution to the polymer chains. The electrical connectivity of the polymer chains is further improved by electropolymerization of another conducting polymer, such as polypyrrole (PPy), polyaniline (PAni), using the polymer gel as the template. Since the gel network acts as a three dimensional electrode, the electropolymerized polymer acquires a three dimensional morphology. Presence of more than one conducting polymer in a material has the advantage of providing electrical conductivity to the material even when one of the polymers is in the non-conducting, undoped state. The latter polymer also improves mechanical stability of the electrode material. The idea presented here, provides flexibility in choosing the second or subsequent materials to be deposited on the initial physically crosslinked gel to impart desired properties function to the electrode. For example, a functional polymer may be used as a component to impart specific chemical characteristics to the material to be applied to sensors or electrocatalytic electrodes. Other water soluble components can be distributed in the composite material even at the time of the physical crosslinking of the dispersion. The PEDOT-PSS, blended with water soluble polymer, polyethyleneoxide (PEO), and physically crosslinked, has been found to form a network structure. This can be applied to solid state electrodes with high effective surface area.

EXPERIMENTAL DETAILS

Preparation of the PEDOT-PSS Hydrogel:

The concentration of the PEDOT-PSS dispersion, Baytron-P (Bayer, Germany), was found to be 1.2 wt %, by drying and weighing. For preparation of the gel, a measured amount (about 15 mg) of the dispersion was spread on a 0.5×1.0 cm$^2$ gold coated silicon wafer, over an area of 0.5×0.5 cm$^2$. The dispersion was concentrated to about 25–30% of its volume, or in some cases was completely dried, in an oven at 40–50° C. A drop of 1 M aqueous solution of a salt of multivalent cation such as $MgSO_4$ or $CaCl_2$, was then added to the dispersion or to the dried film for the physical crosslinking and gelation. After 15 minutes of equilibration in room temperature, the electrode was placed gently in 0.1M solution of the same salt for storage.

Preparation of the PEDOT-PSS Network in a Blend:

For preparation of the blends, PEO with molecular weight of approx. 6×10$^4$ obtained from the British Drug House (BDH) was used. The PEDOT-PSS/PEO blends containing about 10 wt. % PEDOT-PSS was prepared by mixing 1 wt % aqueous solution of PEO by Baytron P in appropriate proportions and spreading the mixture on a glass plate. A film was formed by evaporation of the water at about 70° C. in an oven. For physical crosslinking, the film was equilibrated with aq. 0.25 M $MgSO_4$ solution for at least 5 hr. To remove the excess $MgSO_4$, the films were washed with water 2–3 times by equilibrating the film in excess water each time for 20 min. The formation of the network morphology of the PEDOT-PSS in the blend was confirmed by the sharp change in the conductivity of the material after the physical crosslinking.

Preparation of Another Conducting Polymer in the Gel:

The PEDOT-PSS hydrogel electrode as described above, was equilibrated with an aqueous electrolyte solution containing 0.5 M pyrrole and 0.1 M $Na_2SO_4$ at pH 2, for at least 15 min., in a three electrode electrochemical cell in ambient conditions. PPy was grown on the PEDOT-PSS gel electrode by electrochemical polymerization in the same solution at a potentiostatic condition of 0.5V vs. the Ag/AgCl reference electrode. The amount of charge passed was measured by coulometry; 350–500 mC charge was passed. The electrode was then washed by equilibrating with water. PAni was grown into the hydrogel by a similar procedure.

Application of Gel Electrode as Sensor:

The electrode prepared by crosslinking of the dried PEDOT-PSS film, was used for this purpose. The gel was comparatively denser and supposed to have higher electrical connectivity throughout mass. Therefore, deposition of the second conducting polymer was not required. Aqueous iron complexes were used as test samples. The crosslinked PEDOT-PSS coated electrode was used as the working electrode in a three electrode cell containing aqueous 0.5 mM iron(III) (acetylacetonate)$_3$, a neutral iron complex, and 0.1 M NaCl electrolyte solution at pH 2.6. Cyclic voltammograms of the electrode were recorded between 0.1 V and 0.7 V vs. the Ag/AgCl reference electrode. A 25 times increase in the peak current, due to the iron (III)/iron (II) redox couple, could be observed for the gel electrode at a scan rate of 50 mV/s, compared to that obtained from using a bare gold electrode under the same conditions. When a multivalent iron (III) complex, iron (III) (bipyridyl)$_3^{3+}$ was used as the redox couple at the same conditions, a 100 time increase in peak current could be observed because of the specific interaction between the negatively charged PEDOT-PSS and the positively charged iron complex.

Application of the Gel Electrode in a Supercapacitor:

Two gel electrodes, prepared by crosslinking of the concentrated PEDOT-PSS dispersion and subsequent electropolymerization of a conducting polymer, were used in a cell containing 1 M $Na_2SO_4$ at pH 2.3, as the electrolyte solution. Cyclic voltammograms were recorded at different scan rates, between −0.75V to +0.75V, using one of the electrodes as the reference electrode. The voltammograms were rectangular shaped as expected from ideal capacitors, even at scan rates as high as 200 mV/s. The charging-discharging characteristics of the supercapacitor cells were also studied using chrono-voltammetry in galvanostatic conditions. When both the electrodes used contained PPy as the electropolymerized polymer, energy density of 1.7–2 Wh/kg of the polymer composite, was obtained, without showing any sign of decrease upto a power density of 1.8 kW/kg. For a cell with PAni containing gel electrode as the anode and PPy containing electrode as the cathode, higher energy density was obtained (2.5 Wh/kg), at power density of about 0.6 kW/kg, but the value decreased to its one-third when the power density reached a value of about 2 kW/kg. So the PPy electrode seemed to be more suitable for high power density applications.

What is claimed is:

1. A method for preparing a highly porous network of electroactive conjugated polymers comprising the steps of crosslinking, by a first polymerization, swollen particles of an electroactive conjugated polymer-polyelectrolyte complex dispersed in a medium in the presence multivalent ions, forming a gel structure of said crosslinked particles, and employing said gel structure as a geometrical template in a subsequent polymerization, of another electroactive polymer by chemical polymerization or electrooxidative polymerization, of a monomer inside the gel structure.

2. A method according to claim 1, wherein the dispersion of particles is based on doped or undoped poly(heterocyclic) polymers in complexes with polyelectrolyte chains, and wherein the particles are sterically stabilized by an excess of polyelectrolyte charges and crosslinked by divalent ions to form a highly swollen structure of a polymer P1.

3. A method according to claim 2, wherein the divalent ions comprise $Mg^{2+}$ or $Ca^{2+}$.

4. A method according to claim 2, including the step of employing the highly swollen structure of the polymer P1 as the template for deposition of the another electroactive polymer comprised of yet another conjugated polymer P2 in its doped form.

5. A method according to claim 4, wherein the polymer P2 is deposited by electrochemical polymerization of a heterocyclic monomer inside the highly swollen structure in contact with a current collector to form a stablised highly porous solid.

6. A method according to claim 5, wherein the conjugated polymer P2 comprises a poly(heterocylic) conjugated polymer of pyrrole, thiophene, furan, selenophene, tellurophene, aniline or a derivative thereof.

7. A method according to claim 4, wherein the polymer P2 is deposited by chemical polymerization of a heterocyclic monomer inside the highly swollen structure in the presence of a chemical oxidant to form a stabilized highly porous solid.

8. A method according to claim 1, wherein the conjugated polymer-polyelectrolyte complex comprises a polyheterocyclic conjugated polymer of pyrrole, thiophene, furan, seleophene, tellurophene, aniline or a derivative thereof, and the other electroactive polymer comprises a polyanionic structure of poly(styrenesulphonate), poly(vinylsulphate) or poly (vinylcarboxylate).

9. A method according to claim 8, wherein the thiophene is poly(3,4-ethylene dioxy-thiophene) or a derivative thereof.

10. An electrochemical system comprising a highly porous network of electroactive polymers prepared according to the method of claim 1, as an electrode layer in contact with an electrolyte and wherein charging and discharging of the electrode layer is used for charge and energy storage.

11. An electrochemical system according to claim 10, wherein the electrolyte comprises an aqueous liquid or organic electrolyte or a solid polymer electrolyte.

12. An electrochemical system according to claim 11, in the form of a rechargeable secondary battery.

13. An electrochemical system according to claim 11, in the form of a rapid charge/discharge supercapacitor.

14. An electrochemical system according to claim 10, and comprising an electrode immersed in said electrolyte with a dissolved redox system.

15. An electrochemical system according to claim 14, in the form of redox batteries.

16. An electrochemical system according to claim 14, in the form of an electrocatalytic system.

17. An electrochemical system according to claim 14, in the form of an electrochemical sensor.

* * * * *